(12) United States Patent
Chitradon et al.

(10) Patent No.: US 7,308,117 B2
(45) Date of Patent: Dec. 11, 2007

(54) SYSTEM AND METHOD FOR MANIPULATING INFORMATION AND MAP FOR GEOGRAPHICAL RESOURCE MANAGEMENT

(75) Inventors: Royol Chitradon, Bangkok (TH);
Sitthichai Laoveerakul, Bangkok (TH);
Justin A. Hickey, Bangkok (TH)

(73) Assignee: National Science and Technology Development Agency (TH)

( * ) Notice: Subject to any disclaimer, the term of this patent is extended or adjusted under 35 U.S.C. 154(b) by 409 days.

(21) Appl. No.: 09/771,214

(22) Filed: Jan. 26, 2001

(65) Prior Publication Data

US 2001/0014185 A1 Aug. 16, 2001

(30) Foreign Application Priority Data

Feb. 4, 2000 (TH) .................................... 055604

(51) Int. Cl.
*G06K 9/00* (2006.01)
*G06K 9/54* (2006.01)
*G06K 9/60* (2006.01)
*G06K 9/36* (2006.01)
*G06K 9/46* (2006.01)

(52) U.S. Cl. ...................... 382/113; 382/302; 382/305; 382/232

(58) Field of Classification Search ................. 382/305, 382/113, 302, 232–253
See application file for complete search history.

(56) References Cited

U.S. PATENT DOCUMENTS

| 5,864,632 | A * | 1/1999 | Ogawa et al. ............... 382/113 |
| 6,278,432 | B1 * | 8/2001 | Ratnakar ..................... 345/748 |
| 6,307,573 | B1 * | 10/2001 | Barros ......................... 345/764 |
| 6,430,498 | B1 * | 8/2002 | Maruyama et al. ......... 701/200 |
| 6,512,857 | B1 * | 1/2003 | Hsu et al. .................... 382/294 |
| 6,542,191 | B1 * | 4/2003 | Yonezawa .............. 348/333.01 |
| 6,563,529 | B1 * | 5/2003 | Jongerius ..................... 348/36 |
| 2002/0080408 | A1 * | 6/2002 | Budge et al. ............ 358/261.2 |

* cited by examiner

*Primary Examiner*—Matthew C. Bella
*Assistant Examiner*—Wes Tucker
(74) *Attorney, Agent, or Firm*—Anderson Kill & Olick, PC

(57) ABSTRACT

The present invention provides a system that applies the latest technology related to compression, rendering, and geographical data processing to present an interactive interface to users, which enables them to efficiently manipulate maps and queries for information over the World Wide Web. The method includes a World Wide Web application to display GIS information and obtains user input, and a server application to process user input and to communicate with the database to retrieve or store data.

26 Claims, 1 Drawing Sheet

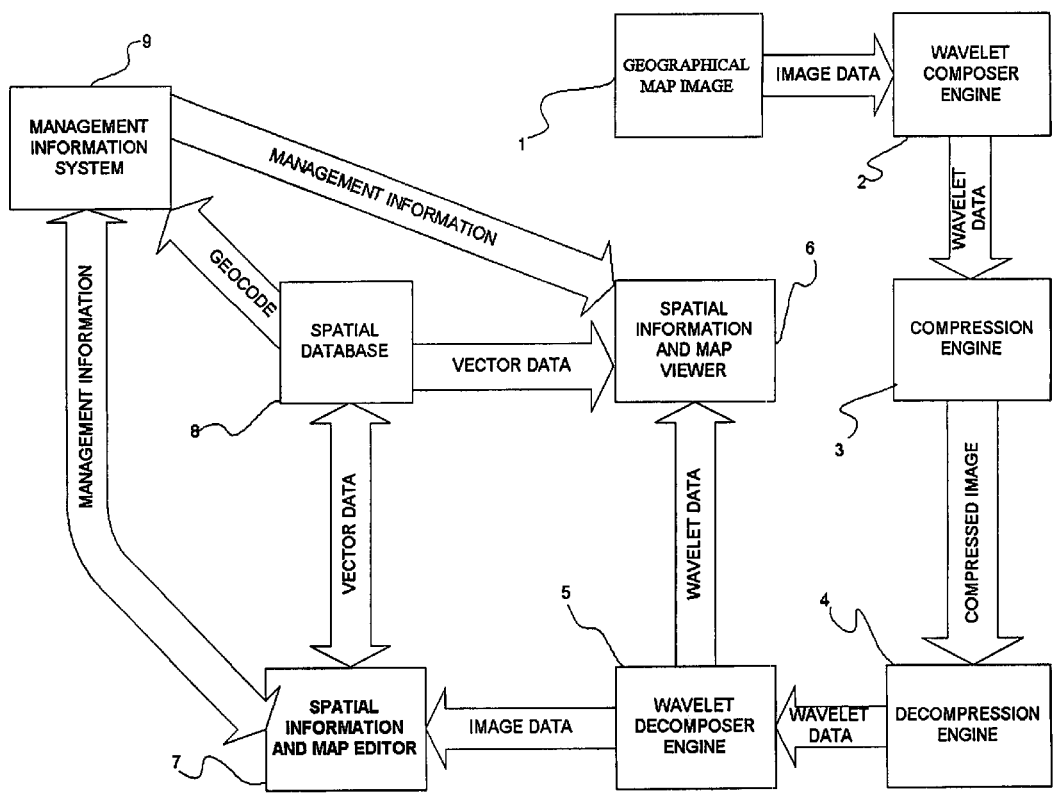

SYSTEM AND METHOD FOR MANIPULATING INFORMATION AND MAP FOR GEOGRAPHICAL RESOURCE MANAGEMENT

BACKGROUND OF THE INVENTION

1. Field of the Invention

The present invention relates to image compression using wavelet transforms, spatial database, metadata and geographical information system (GIS)

2. Description of the Prior Art

GIS software has a variety of functionality including panning and zooming of geographic maps, querying information from a database, and performing geographic analysis. Such functionality typically requires a highend computer. Thus, GIS is expensive for organizations with multiple offices since all offices would require both computer and copy of the GIS software. Furthermore, all offices contribute to the maintenance of the central database requiring high network bandwidth. The present invention can reduce this cost and offer partial GIS functionality. A single server is maintained in a central location while remote sites access the server over the World Wide Web. Complex software is not required on the client, only a Java enabled web browser. Thus, typical PC can be used at the remote sites. However, the major problem of transferring the large amount of data in a reasonable time remains to be addressed. This problem is minimized by utilizing two different approaches offering multiple resolutions of the image and using data compression. In many cases, GIS users want to determine different area or same area in different time. This invention helps this situation by offering the mosaic feature that user can combine different maps to together to form a larger image for comparison or analysis purpose.

The present invention offers a choice of multiresolution images to the user; therefore, high-resolution images are transferred over the internet only when the user requires such detailed images. The multiple resolution images are created using a wavelet transformation. A further benefit of the wavelet transformation is that it reduces the typically high entropy of an image, thus, transforming the image to format highly compressable using typical data compression algorithms. The wavelet transformation will generally be more efficient in entropy reduction than other data transformations, since the localized representation of the data utilized two domains (time and scale) whereas other transformations utilize only one domain. Once the data is transformed into a wavelet data stream and compressed, the amount of data being transferred over World Wide Web is minimized.

This system comprises of a server process, a client process, a spatial database and a relational database. It presents the idea of geographical information access over the World Wide Web network using compression technology and data filtering—in the form of queries and metadata—for efficient use of network bandwidth. In addition, the user can access or change information using the tools provided inside the client application.

General GIS features and capabilities can be provided with the client application without loading the client machine. Commands are passed to the server, which accesses the spatial and relational databases to process the commands. The server retrieves the data and the result is sent to the client application. Therefore, users can access and use the features of the GIS server and its corresponding databases using a standard PC.

SUMMARY OF THE INVENTION

This present invention provides a system that applies the latest technology related to compression, rendering, and geographical data processing to present an interactive interface to users and enables them to efficiently manipulate maps and queries for information over the World Wide Web.

The method includes a World Wide Web application, located on the client, having a capability of decompression and resolution filtering for decreasing the amount of data passing between the server and the client. On the server side, the compression and the resolution filtering are implemented by using wavelet algorithm and compression algorithms. The compressed data is sent across the World Wide Web network to the client application.

The client application separates the data into two types, vector data and raster data. The raster data is the base map, which can be overlayed with vector data. In order to easily manipulate the geographical data elements from the map, the user accesses spatial information stored in the spatial database. Within the application, toolbars are provided for the user to edit the vector and other types of data on the client side before saving the changes to the database.

BRIEF DESCRIPTION OF THE DRAWING

The objects and features of the present invention will become more apparent and the invention itself will be best understood from the following detailed description of the preferred embodiment when read with reference to the accompanying drawing, wherein:

FIG. 1 illustrates an overall system of the present invention including preferred and alternative embodiments of the present invention, in which:

Part 1. Geographical Map Image Storage is an archive to store geographical map images.

Part 2. Wavelet Composer Engine is a software component that contains wavelet algorithm used to transform the image into wavelet format. The algorithm is widely used in compression area.

Part 3. Compression Engine is a software component to compress data that is implemented using combination of mathematical algorithms. The algorithms comprises of two main algorithm called "Huffman Coding" and "Run Length Encoding" algorithms.

Part 4. Decompression Engine is a software component to decompress data that is implemented using combination of mathematical algorithms. The algorithms comprises of two main algorithm called "Huffman Coding" and "Run Length Encoding" algorithms.

Part 5. Wavelet Decomposer Engine is a software component that contains wavelet algorithm used to re-transform the wavelet format back to image.

Part 6. Spatial Information and Map Data Viewer is a software component to display geographical map and information.

Part 7. Spatial Information and Map Editor is a software component to modify geographical map and information.

Part 8. Spatial Database is a database to store spatial geographical information.

Part 9. Management Information System is a database for storing management information.

DETAILED DESCRIPTION OF THE PREFERRED EMBODIMENTS

Referring to FIG. 1, the Geographical Map Image Storage (Part 1) stores geographical map images or satellite images. It stores the original image which is already registered by the satellite or other source of images then it is transformed by the Wavelet Composer Engine (Part 2) which separates the image into layers according to various resolutions creating a wavelet data stream. The user can select a range of resolutions that reduces the amount of data transferred over the network. The wavelet algorithm uses interpolating technique that calculates using the two equations:

$$d_{1,l} = S_{0,2l+1} - [9/16(S_{0,2l} + S_{0,2l+2}) - 1/16(S_{0,2l-2} + S_{0,2l+4}) + 1/2]$$

$$S_{1,l} = S_{0,2l} + [9/32(d_{1,l-1} + d_{1,l}) - 1/32(d_{1,l-2} + d_{1,l+1}) + 1/2]$$

In addition, the Compression Engine (Part 3) compresses the wavelet data stream by using Run Length Encoding and Huffman Coding to obtain the smallest number of bytes before passing the data through the network. Run Length Encode counts on how many continuous data bytes and add an overhead byte to indicate that duplicate number of bytes. Huffman Coding creates a tree of frequent use symbols and map keys to substitute that symbol. The Huffman Coding works differently on the bytes indicating number of continuous and the data bytes. When a client process receives the compressed data stream from the network, the Decompression Engine (Part 4) decompresses the data, converting it back to a wavelet data stream. The Wavelet Decomposer Engine (Part 5) then reassembles the wavelet data stream into the original image of the map. Next, the Spatial Information and Map Viewer (Part 6) renders the map. The vector data stored in the Spatial Database (Part 8) is typically data from the GIS and is used to populate the Spatial Database (Part 8) synchronized with the MIS (Part 9) by using geo-codes, which uniquely identifies each geographic entity and links linking the spatial data to information in the MIS (Part 9). The Spatial Database is a database with features of spatial functions and operators, which help user to calculate basic operation and reduce amount of data passing to the user. The MIS is an information base using normal database management system. Also metadata is used in the spatial database to provide intelligent searching capabilities. SQL Queries are used to obtain the vector data from the Spatial Database (Part 8) and may include geometric operators available in the spatial database to determine which data is required. The vector data is then rendered as polygons, paths, or points depending on the nature of the geometric entity being rendered. The spatial Information and Map Editor (Part 7) is similar to the Spatial Information and Map Viewer (Part 6) but allows the user to change the vector data.

Part 1 to Part 3 are located in the server machine while Part 8 to Part 9 are located in the appropriate databases on the server. Part 4 to Part 7 are used to display or edit the result and are located in the client machine. The server is responsible for querying vector data and loading images in response to client application requests. When the server receives a load image request, it will find and load the image from the Geographical Map Image Storage (Part 1). To create the multiple resolutions, the image is passed to the Wavelet Composer Engine (Part 2), which transforms the image into a wavelet data stream. The wavelet data stream is then sent to the Compression Engine (Part 3), which uses a combination of compression algorithms. Each compressed level of resolution is stored in a file for future reference.

When the server receives a query request, it will execute the query in either the spatial database or relational database, depending on the nature of the query. The query is defined by the client and is sent as part of the request to the server. A database connection interface is used to communicate with the database, which returns the result of the query to the server. The result is filtered and searched faster by using metadata and then it is compressed using compression algorithms before it is sent to the client.

The client is composed of several components that not only processes the data communication with the server, but also presents a graphical user interface (GUI) allowing the user to display and manipulate map data from a GIS. For example, it can display a satellite image of a city with additional layers of buildings, roads, and rivers.

The client has two main components, a data processing component, and a GUI component. The data processing component is responsible for submitting requests to the server, and processing the returned results. After the client sends a load image request, it waits for the result to return and then sends the data to the decompression engine (Part 4), to be decompressed. At this stage, the data is a wavelet data stream and is sent to the Wavelet Decomposer Engine (Part 5) to reassemble the data into the original image. Finally the restored image is sent to a data cache from which the spatial information and map data viewer (Part 6) or the Spatial Information and Data Editor (Part 7) can access it.

For a query request, the data processing component first forms the query and then sends the request. The returned result is sent to the Decompression Engine (Part 4) and then sent to the data cache for access by either the Spatial Information and Map Data Viewer (Part 6) or the Spatial Information and Map Data Editor (Part 7).

These query requests include both MIS requests, and Spatial Database (Part 8) requests. The MIS information is simply displayed in an appropriate manner. The spatial data returned by a request is typically represented in an individual layer, which contains a set of vectors, or points that have some geographic meaning.

The GUI component runs as a java applet on a web browser and is part of both the Spatial Information and a Map Data Viewer (Part 6) and the Spatial Information and a Map Data Editor (Part 7). It also contains Decompression Engine and Wavelet Decomposer Engine in order to retransform the compressed data back to the original data. The GUI has three windows to view various levels of detail of the image map. A top-left window presents a view of the whole map divided into map cells, the user can click a cell and the area of the map contained in the cell is displayed in the bottom-left window. The applet contains PartThis window is a zoom and pan window in which a user can click the left or right mouse button to zoom in or out respectively. The user can also drag the mouse to pan around the map. A detail window is displayed as a large window on the right showing the map and vector data for the selected area on the zoom and pan window.

Layers represent the data of the detail window, including the map image and the vector data. A legend to the right of the detail map indicates the available layers and categorizes the vector data by color. Checkboxes are included in the legend, which allow the user to toggle each layer's visibility.

The console area shows the sizes of the full image, the compressed image, and approximate size of the next zoom level. It also displays the UTM coordinates when the user moves the cursor pointer over the detail window. Finally a scale bar indicates the scale of the image in the detail window.

The two most important components of the Spatial Information and Map Data Viewer (Part 6) and the Spatial Information and Map Data Editor (Part 7) are the raster component and the vector component.

The raster component is responsible for displaying the map as well as the information corresponding to the detail inside the map such as UTM coordinates, the date and time that the map was created, and the map resolution. Each level of the map has its own scale that will be displayed on the scale bar to indicate the distance ratio. In addition, users can move the mouse cursor onto the map and see the UTM coordinates of that point. The raster map is the base map with all additional layers being rendered on top of it. However, it can also be toggled on or off.

The Geographical Map Image Storage (Part 1) maintains several images for the various areas available for display. In most cases, a single image does not cover enough area to be useful to users. Therefore, this invention implements a mosaic feature. This feature determines the image files that cover the area being requested and seamlessly joins them together to form a larger image.

The unique features of the raster component are the interactive pan and the zoom. This means that when the user pans or zooms, a new web page is not loaded. Instead, only the detailed image in the raster viewer is updated. This not only saves time from downloading all the elements of the web page, but also gives the user a pleasant interface since only the single image changes not the whole page.

The vector component is capable of rendering several different types of vector data. These types include polygon data (both filled and outline), path or line data, and point data. The vector data is stored in the Spatial Database (Part 8), which allows geometric operations to be performed on the vector data. For example, the database can determine if a point is within one of the polygons that are stored in one of its tables. Such capability allows the user to perform simple queries to the database using mouse clicks on the map. Thus, storing the vector data in the Spatial Database is very useful.

The vector data are rendered on top of the map using separate layers. For example, the roads for a map would be rendered as a single layer, while the waterways of the map would be rendered in another separate layer. The layers are implemented such that each layer queries the Spatial Database (Part 8) for the vector data required to be rendered. The data is returned in UTM coordinates that are then transformed to screen coordinates, and finally the vector data is rendered on the map.

Each layer also has a state variable that controls the visibility of the layer. With this feature, part of the graphical user interface can be a switch that will toggle the visibility of the particular layer of vector data. This gives the user the capability of removing data from the map when the area of interest is too crowded with data.

It should be noted that some vector data is not stored in the Spatial Database (Part 8). For example, the UTM grid can easily be generated from the bounding box of the map. Furthermore, the gridlines would be different for each level of zoom in the map. Therefore, it is not necessary to store the grid lines (one set for each zoom level) in the Spatial Database (Part 8), but generates them as a separate layer.

The Spatial Information and Map Data Editor (Part 7) is similar to the Spatial Information and Map Data Viewer (Part 6) except that it has limited zoom capabilities and additional GUI features to implement additions, deletions and modifications to both the Spatial Database (Part 8) and MIS (Part 9), the Spatial Information and Map Editor (Part 7) has a single window that displays the map and vector data in the same resolution as that of the detailed image of the Spatial Information and Map Data Viewer (Part 6). The user has the choice of zooming in one extra level for more accurate digitizing.

While the particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

What is claimed is:

1. A method for displaying and manipulating geographical information using World Wide Web technology, the steps comprising:
   (a) retrieving geographical map images from a geographical map image database, said geographical map image database being dedicated to storing a geographical raster map or satellite image therein, the geographical map images contain individual raster images of the map divided from a whole map sheet or the satellite image, wherein said geographical map images are raster data stored in said geographical map image database;
   (b) transforming the raster images into a wavelet data stream which is completely retransformable back to the original raster images;
   (c) compressing the wavelet data stream into a compressed data stream so that said raster data of said geographical map images is separated into layers by use of said wavelet data stream and compressed before being transmitted over a network;
   (d) transmitting the compressed data stream over the network to a client side;
   (e) decompressing the compressed data stream into the wavelet data stream;
   (f) retransforming the wavelet data stream into the raster images;
   (g) displaying the raster images using one of either a spatial information and map viewer or a spatial information and map editor,
   (h) analyzing a user requirement and sending a suitable query to a spatial database;
   (i) retrieving vector data from said spatial database for defining features of said geographical information other than geographical raster map images using metadata and geocode to identify coordinates for each of the geographical elements on the vector data corresponding to said other features of geographical information with said spatial database being dedicated to storing vector data and being a database separate and distinct from said geographical map image database;
   (j) editing the vector data using said spatial information and map editor;
   (k) storing the edited vector data in said spatial database;
   (l) storing the geographical raster map or satellite image in said geographical map image database;
   (m) displaying raster data on the spatial information and map viewer at the client side under control of the spatial information and map viewer,
   (n) zooming and/or panning the displayed image map of raster data;
   (o) rendering vector data from the spatial database to establish screen coordinates for said other features of geographical information; and (p) displaying the vector data at the screen coordinates on the map displayed from said geographical map image database.

2. The method of claim 1, wherein the geographical map can be any form of a map including a registered satellite image.

3. The method of claim 1, wherein wavelet transformation is used to transform said map into various resolution maps.

4. The method of claim 3, wherein said various resolution maps can be filtered for the desired resolution.

5. The method of claim 4, wherein filtered maps are compressed by using compression algorithms.

6. The method of claim 5, wherein the compressed data of the filtered maps is transferred over the World Wide Web to the client by using an internet network.

7. The method of claim 6, wherein said compressed data is sent across the World Wide Web to a client process and decompressed into said wavelet data stream.

8. The method of claim 7, wherein said wavelet format data stream is retransformed into a geographical map.

9. The method of claim 1, further comprising the steps of using a management information system (MIS) to send an inquiry to retrieve vector data from the spatial database under control of the spatial database, comprising the steps of:
   (a) storing the vector data to be retrieved;
   (b) storing a geocode that links to information in the MIS management information system to the spatial database;
   (c) sending the geocode to the management information system for more information; and
   (d) sending the vector data to the spatial information and map viewer or the spatial information and map editor.

10. The method of claim 9, wherein the query is used in combination with metadata to search for required data.

11. The method of claim 10, wherein metadata explains the meaning of data as well as its logical structure.

12. The method of claim 10, wherein the required data is compressed and sent back to the client.

13. A system for displaying and manipulating geographical information using World Wide Web technology, and a spatial information and map editor, comprising:
   (a) a geographical map image storage database dedicated to storing a geographical raster map or satellite image data as raster data containing individual raster images of the geographical map divided from a whole map sheet or the satellite image;
   (b) means for transforming the raster data of raster images into a wavelet data stream which is completely retransformable to the original raster images;
   (c) means for compressing the wavelet data stream into a compressed data stream so that said raster data of said geographical map images is separated into layers by use of said wavelet data stream and compressed before being transmitted over a network;
   (d) means for transmitting the compressed data stream over the network to a client side;
   (e) means for decompressing the compressed data stream into the wavelet data stream;
   (f) means for retransforming the wavelet data stream into raster data of the raster images;
   (g) means for displaying the raster data of raster images using one of either a spatial information and map viewer or the spatial information and map editor;
   (h) means for analyzing a user requirement and sending a suitable query to a spatial database;
   (i) means for retrieving vector data from said spatial database for defining features of said geographical information other than said raster images using metadata and geocode to identify the coordinates of each of the geographical elements of said features of said geographical information with said spatial database being dedicated to storing the vector data therein and being a database separate and distinct from said geographical map image database;
   (j) means for editing the vector data using said spatial information and map editor;
   (k) means for storing the edited vector data in said spatial database;
   (l) means for storing the geographical raster map or satellite image in said geographical map image storage database;
   (m) means for displaying raster data from said geographical map image database on the spatial information and map viewer;
   (o) means for receiving user input to zoom and/or pan the displayed raster data; and
   (p) means for rendering vector data from the spatial database to provide screen coordinates of said other features of geographical information.

14. A system for displaying and manipulating geographical information using World Wide Web technology, comprising:
   (a) means for retrieving geographical map images from a geographical map image database, said geographical map image database being dedicated to storing a geographical raster map or satellite image therein, the geographical map images contain individual raster images of the map divided from a whole map sheet or the satellite image, wherein said geographical map images are raster data stored in said geographical map image database;
   (b) means for transforming the raster images into a wavelet data stream which is completely retransformable to the original raster images;
   (c) means for compressing the wavelet data stream into a compressed data stream so that said raster data of said geographical map images is separated into layers by use of said wavelet data stream and compressed before being transmitted over a network;
   (d) means for transmitting the compressed data stream over the network to the client side;
   (e) means for decompressing the compressed data stream into the wavelet data stream;
   (f) means for retransforming the wavelet data stream into the raster images;
   (g) means for displaying the raster data of raster images using one of either a spatial information and map viewer or a spatial information and map editor;
   (h) means for analyzing a user requirement and sending a suitable query to a spatial database;
   (i) means for retrieving vector data from said spatial database for defining other features of said geographical information other than said raster data using metadata and geocode to identify and provide coordinates of each of the geographical elements of said other features of said geographical information, said spatial database being dedicated to storing the vector data therein and being a database separate and distinct from said geographical map image database;
   (j) means for editing the vector data using said spatial information and map editor;

(k) means for storing the edited vector data in said spatial database;

(l) means for storing the geographical raster map or satellite image in said geographical map image database; and (m) means for displaying on the spatial information and map viewer at the client side under control of the spatial information and map viewer geographical information from both said spatial database and said geographical map image database.

15. The system of claim 14, wherein the geographical map can be any form of a map including a registered satellite image.

16. The system of claim 14, wherein wavelet transformation is used to transform said map into various resolution maps.

17. The system of claim 16, wherein said various resolution maps can be filtered for a desired resolution.

18. The system of claim 17, wherein filtered maps are compressed by using compression algorithms.

19. The system of claim 18, wherein the compressed data of the filtered maps is transferred over the World Wide Web to the client by using an internet network.

20. The system of claim 19, wherein said compressed data is sent across the World Wide Web to a client process and decompressed into said wavelet data stream.

21. The system of claim 20, wherein said wavelet data stream is retransformed into a geographical map.

22. The system of claim 14, further comprising a management information system for sending a query to retrieve vector data from the spatial database under control of the spatial database and further comprising:

(a) means for storing the vector data;

(b) means for storing the geocode to link the information in management information system to the spatial database;

(c) means for sending the geocode to the management information system for more information; and (d) means for sending the vector data to the spatial information and map viewer or the spatial information and map editor.

23. The system of claim 22, wherein the query is used in combination with metadata to search for required data.

24. The system of claim 23, wherein metadata explains the meaning of data as well as its logical structure.

25. The system of claim 23, wherein the required data is compressed and sent back to the client.

26. A system for displaying and manipulating geographical information using World Wide Web technology, and a spatial information and map editor, comprising:

(a) means for retrieving geographical map images from a geographical map image database, said geographical map image database being dedicated to storing a geographical raster map or satellite image therein, the geographical map images contain individual raster images of the map divided from a whole map sheet or the satellite image, wherein said geographical map images are raster data stored in said geographical map image database;

(b) means for transforming the raster images into wavelet data stream which is completely retransformable back to the original raster images;

(c) means for compressing the wavelet data stream into a compressed data stream so that said raster data of said geographical map images is separated into layers or use of said wavelet data stream and compressed before being transmitted over a network;

(d) means for transmitting the compressed data stream over the network to the client side;

(e) means for decompressing the compressed data stream into the wavelet data stream;

(f) means for retransforming the wavelet data stream into the raster images;

(g) means for displaying the raster data of raster images using one of either a spatial information and map viewer or the spatial information and map editor;

(h) means for analyzing a user requirement and sending a suitable query to a spatial database;

(i) means for retrieving vector data from said spatial database for defining other features of said geographical information other than said raster data using metadata and geocode to identify coordinates of each of the geographical elements of said other features of said geographical information with said spatial database being dedicated to storing vector data and being a database separate and distinct from said geographical map image database;

(j) means for editing the vector data using said spatial information and map editor;

(k) means for storing the edited vector data in said spatial database;

(l) means for storing the geographical raster map or satellite image in said geographical map image database;

(m) means for receiving user input to allow raster data to be zoomed and panned when displayed; and (n) means for rendering vector data from the spatial database to provide screen coordinates of said other features of graphical information for display with said displayed raster data.

* * * * *